United States Patent
Benz et al.

(10) Patent No.: US 9,453,460 B2
(45) Date of Patent: Sep. 27, 2016

(54) MIXING ELEMENT FOR GAS TURBINE UNITS WITH FLUE GAS RECIRCULATION

(71) Applicant: ALSTOM Technology Ltd, Baden (CH)

(72) Inventors: Eribert Benz, Birmenstorf (CH); Niclas Lars Olof Lindqvist, Växjö (SE); Ali Mustapha Tabikh, Växjö (SE); Lars Filip Lundin, Jät (SE)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 542 days.

(21) Appl. No.: 13/948,296

(22) Filed: Jul. 23, 2013

(65) Prior Publication Data

US 2013/0305732 A1 Nov. 21, 2013

Related U.S. Application Data

(63) Continuation of application No. PCT/EP2012/050964, filed on Jan. 23, 2012.

(30) Foreign Application Priority Data

Jan. 24, 2011 (CH) ........................................ 115/11

(51) Int. Cl.
*F02C 7/04* (2006.01)
*B01F 3/02* (2006.01)
(Continued)

(52) U.S. Cl.
CPC . *F02C 7/04* (2013.01); *B01F 3/02* (2013.01); *B01F 5/0456* (2013.01); *B01F 5/0463* (2013.01); *F02C 3/34* (2013.01); *F02C 7/057* (2013.01); *F05D 2260/2212* (2013.01); *F05D 2260/61* (2013.01); *Y02E 20/16* (2013.01)

(58) Field of Classification Search
CPC ...... B01F 3/02; B01F 5/0456; B01F 5/0463; F02C 3/34; F02C 7/057; F02C 7/04; F05D 2260/2212; F05D 2260/61
See application file for complete search history.

(56) References Cited

U.S. PATENT DOCUMENTS 4,561,245 A 12/1985 Ball
5,207,714 A * 5/1993 Hayashi ............. F02M 25/0721
123/568.17

(Continued)

FOREIGN PATENT DOCUMENTS

CH 701 235 12/2010
CH 701 236 12/2010

(Continued)

*Primary Examiner* — Carlos A Rivera
(74) *Attorney, Agent, or Firm* — Buchanan Ingersoll & Rooney PC

(57) ABSTRACT

The invention pertains to fluegas recirculation in gas turbines, and specifically to an intake section upstream of the inlet of a compressor of a gas turbine unit with fluegas recirculation. The intake section includes at least one section with a flow path defined by sidewalls in which the fresh airflow of the intake air is flowing along a principal airflow direction, including at least one mixing duct extending into the flow path from at least one sidewall. The mixing duct includes an intake at the at least one sidewall for receiving recirculated fluegas, as well as including at least one outlet opening distanced from said sidewall for blowing recirculated fluegas out of the mixing duct into the airflow.

20 Claims, 12 Drawing Sheets

(51) Int. Cl.
  *F02C 3/34*    (2006.01)
  *F02C 7/057*   (2006.01)
  *B01F 5/04*    (2006.01)

(56) References Cited

U.S. PATENT DOCUMENTS

| | | | | |
|---|---|---|---|---|
| 6,027,305 | A * | 2/2000 | Ng | F02C 7/045 415/1 |
| 6,044,827 | A * | 4/2000 | Pfaff | F02B 47/08 123/568.18 |
| 6,293,265 | B1 * | 9/2001 | Gagnon | F02M 25/0703 123/568.17 |
| 6,513,508 | B2 * | 2/2003 | Fischer | F02M 25/0703 123/568.17 |
| 7,028,680 | B2 * | 4/2006 | Liu | F02M 25/0722 123/568.17 |
| 7,140,357 | B2 * | 11/2006 | Wei | F02B 29/0425 123/568.17 |
| 2006/0091243 | A1 * | 5/2006 | Hoffmann | F02C 7/045 239/589.1 |
| 2009/0028698 | A1 * | 1/2009 | McCaffrey | F01D 5/145 415/208.1 |
| 2009/0050120 | A1 * | 2/2009 | Bischofberger | F02M 25/0722 123/568.11 |
| 2009/0107130 | A1 * | 4/2009 | Emerick | B01F 3/02 60/324 |
| 2009/0165756 | A1 * | 7/2009 | Shieh | B01F 3/02 123/568.17 |
| 2009/0229263 | A1 | 9/2009 | Ouellet et al. | |

FOREIGN PATENT DOCUMENTS

| | | |
|---|---|---|
| JP | 2001-020755 | 1/2001 |
| JP | 2006-326571 | 12/2006 |
| WO | 2005/088103 | 9/2005 |
| WO | 2010/072710 | 7/2010 |
| WO | 2010/072729 | 7/2010 |
| WO | 2010/142560 | 12/2010 |
| WO | 2010/142573 | 12/2010 |

* cited by examiner d.)

e.)

MIXING ELEMENT FOR GAS TURBINE UNITS WITH FLUE GAS RECIRCULATION

CROSS-REFERENCE TO RELATED APPLICATIONS

This application claims priority to PCT/EP2012/050964 filed Jan. 23, 2012, which claims priority to Swiss Application 00115/11 filed Jan. 24, 2011, both of which are hereby incorporated in their entirety.

TECHNICAL FIELD

The present invention relates to the field of fluegas recirculation in gas turbines, specifically to elements for mixing fluegas with ambient air upstream of the compressor.

BACKGROUND

There is a proposal to enrich the carbon dioxide concentration at the gas turbine exhaust by means of a fluegas recirculation (FGR) system, in combination with post-combustion carbon dioxide capture. In this respect reference is made to WO-2010072710 disclosing such a setup. Fluegas recirculation is beneficial for the carbon dioxide capture process because both the concentration of carbon dioxide is increased and the overall mass flow to the carbon dioxide capture unit is reduced. These two aspects result in smaller carbon dioxide capture equipment with a more efficient capture process.

SUMMARY

When using fluegas recirculation in a gas turbine system the carbon dioxide enriched fluegas has to be mixed with ambient air and then supplied to the compressor inlet of the gas turbine. The compressor delivers this carbon dioxide containing mixture to the combustor and into the secondary cooling systems of the gas turbines.

The recirculation of fluegas lowers in total the amount of oxygen which is supplied to the combustion process. The remaining oxygen concentration after the combustion process is the limiting parameter for the amount of recirculated fluegas. If the fluegas ratio, defined as the ratio of recirculated fluegas and the gas turbine exhaust mass flow, is too high, the amount of oxygen is less than required for a stoichiometric combustion. In this case incomplete combustion will occur, which leads to high carbon monoxide emissions, unburnt hydrocarbons (UHC), flame instability, and finally the flame can even extinguish. Therefore a good mixing needs to be ensured over the whole operation range. Lowest possible pressure loss needs to be ensured in order not to lose power and efficiency of the power plant. The control of the fluegas recirculation ratio is essential to allow for safe gas turbine operation. A robust design of the mixer is critical to ensure good mixing quality over a wide range of fuel gas ratios and load parameters of the turbine.

In other words the recirculated fluegas has to be evenly mixed with the fresh air upstream of the compressor.

The gist of the present invention is to install a mixer device in the intake of the gas turbine, wherein this mixer device can for example be upstream or downstream of the filter and/or the silencer in the intake. The mixer can for example be a finger type mixer extending from one single sidewall of the intake unit into the flow path defined thereby. Plates and/or guide vanes can be used to improve mixing in the pipes of the mixer, at the outlet of the mixer or downstream of the outlet of the mixer.

Specifically therefore the present invention relates to an intake section upstream of the inlet of a compressor of a gas turbine unit with fluegas recirculation, comprising at least one section with a flow path defined by sidewalls in which the fresh airflow of the intake air is flowing along a principal airflow direction, and comprising at least one mixing duct or mixing finger extending into the flow path from at least one sidewall. This mixing duct preferably comprises an intake at said at least one sidewall for receiving recirculated fluegas, as well as at least one outlet opening distanced from said sidewall for blowing recirculated fluegas out of the mixing duct into the airflow, preferably not too close to a wall region thereof but in a more central region thereof.

According to a first preferred embodiment of such an intake section, the mixing duct is attached to a single sidewall only (mixing finger) and freely extends into the flow path. Preferably in this case the at least one outlet opening is located in a tip region of the mixing duct or in proximity thereto, or distributed along the length of the duct.

At least two, three, four, or at least five mixing ducts can be arranged in a row, preferably adjacent to each other, said row preferably being aligned essentially along the airflow direction, the most upstream mixing duct defining a leading edge of the row. Preferably the mixing ducts of such a row all have different lengths of extension into the flow path, and preferably the most upstream mixing duct extends most into the flow path, the most downstream mixing duct extends the least into the flow path, and mixing ducts between are of successively decreasing length as a function of their downstream position, wherein further preferably the lengths are regularly decreasing along the row. In case of such a row, but also in case of individual mixing ducts, in a direction perpendicular to the airflow direction at least two, or at least three, or at least four rows/mixing ducts can be arranged distanced from each other, preferably equally distanced from each other, in the flow path. Alternatively or additionally, along the airflow direction at least two or at least three rows/mixing ducts can be arranged distanced from each other, in the flow path.

The at least one mixing duct, or the row of mixing ducts, can extend into flow path with its axis essentially perpendicular to airflow direction in the flow path. It can however also be inclined thereto, and for example the leading edge thereof can have a bent or curved shape depending inter alia, on the aerodynamics in the flow path. Preferentially in the flow path the airflow direction is essentially parallel to the sidewalls.

The mixing duct can be of tubular design. Alternatively it may comprise or be formed by four, preferably pairwise parallel walls defining the duct.

The outlet opening can open in a direction essentially perpendicular to the direction of the airflow or in a direction essentially parallel and concurrent to the direction of the airflow (blowing out of the trailing edge).

The at least one outlet opening can open in a direction essentially perpendicular to the direction of the airflow and essentially perpendicular to the axis of the mixing duct (lateral blowing out), wherein preferably two outlet openings are provided for each mixing duct blowing recirculated fluegas in opposite directions into the airflow in the flow path.

In the at least one outlet opening or in the region of the at least one outlet opening at least one, rounded or straight guide vane can be located, wherein this guide vane can for example be located essentially at half height of the total height of the outlet opening in the direction along the axis of the mixing duct.

The at least one outlet opening according to a further preferred embodiment opens in a direction essentially perpendicular to the direction of the airflow and essentially parallel to the axis of the mixing duct, and a mixing element, preferably an impingement plate, is located downstream, with respect to the flow direction of the fluegas, of the outlet opening, preferably arranged essentially perpendicularly to the flow direction of the fluegas and parallel to the airflow direction.

According to yet another preferred embodiment, the mixing ducts are arranged in a region where the flow path is defined by four pairwise parallel sidewalls, and upstream and/or downstream of the mixing duct or of the row of mixing ducts a silencer and/or a filter is arranged in that region or essentially just upstream and/or downstream of that region.

For ideal flow conditions and as little pressure loss along the mixing device the mixing duct or in case of a row of mixing ducts the most upstream located mixing duct comprises an aerodynamically optimised leading edge, for example a rounded leading edge. It is also possible to locate turbulators upstream of the openings on the outside of the mixing ducts to initiate turbulences somewhat upstream of the location where the fluegas is introduced into the airflow to further increase the mixing quality.

According to one particular preferred embodiment essentially a triangular row of mixing ducts is proposed showing an excellent mixing property. According to this embodiment at least two, or at least three, or at least four, or at least five mixing ducts are arranged in a row, adjacent to each other, said row being alignment essentially along the airflow direction, the most upstream mixing duct defining a (preferably rounded) leading edge of the row, wherein the mixing ducts all have different lengths of extension into the flow path, and wherein the most upstream mixing duct extends most into the flow path, the most downstream mixing duct extending least into the flow path, and mixing ducts between being of successively and preferably regularly decreasing length as a function of their downstream position, wherein the trailing edge of the row is defined by an inclined trailing edge wall and wherein on each lateral side of the row triangular outlet openings open in a direction essentially perpendicular to the direction of the airflow and essentially perpendicular to the axis of the mixing duct. One side of these triangular openings is preferably formed by the inclined trailing edge wall.

The present invention furthermore relates to a gas turbine, preferably combined cycle gas turbine, with an intake section as outlined above.

In a further embodiment it relates to a plant with flue gas recirculation in combination with post-combustion carbon dioxide capture. In addition to that, the present invention relates to a method for recirculating fluegas to the intake of a gas turbine unit, preferably of a combined cycle, wherein an intake section as outlined above is used for mixing fresh ambient air with recirculated fluegas. According to a preferred embodiment of such a method, flow control elements, controlled based on a mass flow measurement in the recirculation line and/or based on a measurement of the composition of the mixed intake air upstream of the compressor, and/or based on a measurement of the combustion quality, are provided in the mixing ducts or upstream of the mixing ducts, are used for controlling the mass flow of recirculated fluegas.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DETAILED DESCRIPTION

Figure 1:
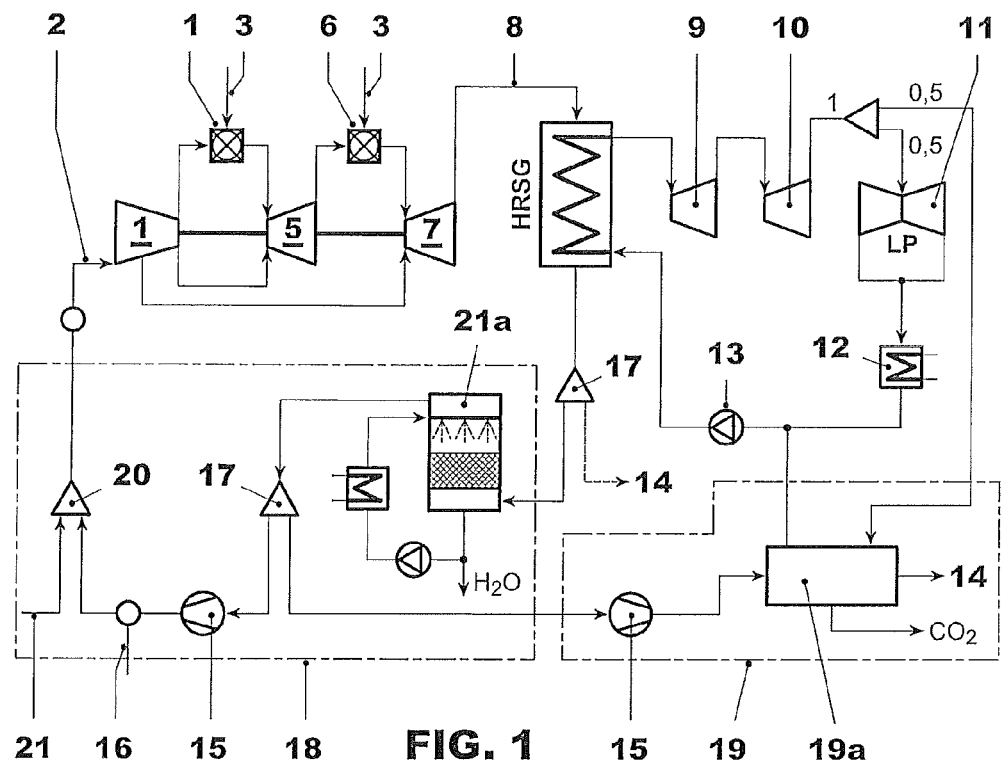
FIG. 1 shows a schematic representation of a combined cycle with fluegas recirculation.

FIG. 1 shows a general schematic set up of a combined cycle power plant with flue gas recirculation. In a compressor 1 intake air is compressed and introduced to a first combustor 4, supplied with fuel 3, and the resulting combustion air passes a high pressure turbine 5, downstream of which a second combustor 6 is located, downstream of which in a low pressure turbine 7 the exhaust gases are expanded as much as possible. Downstream of the low pressure turbine 7 a heat recovery steam generator 8 is located by means of which, using the heat in the exhaust gases, steam is generated for driving steam turbines. The steam is expanded in a first stage in a high pressure steam turbine 9, followed by an intermediate pressure steam turbine 10 and subsequent to this by a low pressure steam turbine 11, where usually means are provided for by-passing the low pressure steam turbine 11. Downstream of the low pressure steam turbine 11 a condenser 12 condenses the steam to water, which is subsequently pumped by a pump 13 into the heat recovery steam generator unit 8, where it is converted in counter flow to the flow of the exhaust gases to steam again. Normally the steam cycle is an essentially closed cycle.

Downstream of the heat recovery steam generator unit 8 the exhaust gases, now cooled down to a certain extent, usually pass a diverter 17, where depending on the mode of operation a fraction of the exhaust gases or the totality thereof can be guided to a stack 14 or to a downstream flue gas recirculation system and/or carbon capture system.

The fraction guided to the flue gas recirculation system usually first passes a direct contact cooler 21a, downstream of this a diverter 17 is provided which, again depending on the mode of operation and specific parameters measured in the unit, a fraction of the exhaust gases is fed to the carbon capture unit, and the other fraction is recirculated in the actual flue gas recirculation piping, which usually also comprises at least one blower 15 as well as a mass flow measurement device 16 in order to control, for the reasons outlined above, the amount of recirculated flue gas in order to keep the combustion conditions in an optimum window. For flue gas recirculation these exhaust gases are mixed with ambient air in a mixer 20 which is typically located upstream of the intake housing which is essentially adjacent and upstream of the intake of the compressor 1. In this example the direct contact cooler 21a comprises a water spray, which is injected into the flue gas. The water droplets are collected and re-cooled before they are re-injected.

The fraction of the exhaust gases not recirculated and not specifically used in the flue gas recirculation system 18 are introduced into the carbon capture system 19, if necessary assisted by a blower 15, where in a carbon dioxide absorption unit 19a the carbon dioxide is extracted from the gases and taken out of the system and the remaining gas is fed to a stack 14.

The present invention pertains to a specific device for mixing re-circulated flue gas with newly aspired ambient air 21, and the idea is to locate the corresponding mixing device in the actual intake section or intake housing 2 upstream of the compressor inlet.

Figure 2A:
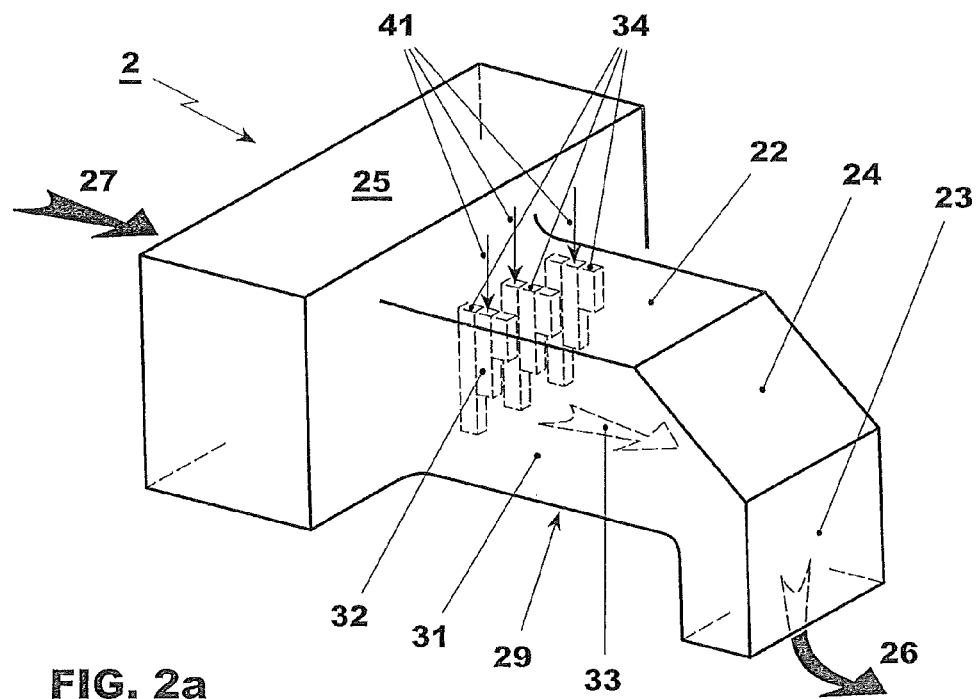
FIG. 2 in a) shows a perspective view onto an intake housing with three mixing fingers each with three ducts, in b) shows a rows of mixing fingers in a lateral view with fluegas introduction in axial direction with respect to the axis of the fingers; and in c) shows a row of mixing fingers in a lateral view with fluegas introduction in a direction parallel to the airflow.

A corresponding device is illustrated in FIG. 2a in a perspective view. Such an intake housing 2 usually comprises a wide aspiration section 25 into which the ambient air flow 27 is flowing. Downstream of this wide aspiration section 25 or within this wide aspiration section 25, typically the flow cross section reduces and is followed by a typically horizontal section 22 of constant flow cross section. Downstream of this section 22 there is typically provided a bent section 24 diverting the airflow to a vertical direction and into a vertical section 23 of the intake housing so that the airflow 26 can enter the intake of the compressor 1, and can be compressed in the compressor 1.

In accordance with the invention, mixing ducts 32 are located in section 22 in the form of a multitude of fingerlike elements protruding from one of the side walls of the section 22 into the flow path 31, typically in a direction essentially perpendicular to the airflow direction 33 in the section 22. The mixing ducts 32 are mounted on one of the side walls (or on several of the side walls), and where they are fixed to the side walls there is provided an inlet 34 for the intake of re-circulated flue gas 41.

FIG. 2b illustrates a first embodiment of such mixing ducts. In this case a row of three mixing ducts 32 in the form of tubular elements with rectangular or square cross section are arranged adjacent to each other. Of the three mixing ducts 32, the one located most upstream, is the longest one, therefore penetrates the most into the flow path 31, and it also forms the leading edge 35 of the row as the subsequent mixing ducts are arranged in a downstream direction thereof. Within the row the mixing ducts are of regularly decreasing lengths such that the mixing duct located most downstream is the shortest one and penetrates the least into the flow path 31, and essentially forms the trailing edge 36 of the row of mixing ducts. Like that the row of mixing ducts provides for a structure where, as at the end of each mixing duct there is an opening 37 through which flue gas taken in via inlets 34, is blown out as illustrated with the arrows 39, and introduces the re-circulated flue gas in a distributed manner over the flow cross section of the airflow 33.

An alternative embodiment is illustrated in FIG. 2c. In contrast to the embodiment according to FIG. 2b, where essentially the tubular mixing ducts 32 are not provided with a bottom wall thereby providing the openings 37 there, in this case the tubular elements 32 are closed towards the bottom but on each tip portion on the corresponding trailing side of each mixing duct there are provided outlet openings 37 through which the flue gas exits the mixing ducts essentially in a direction parallel to the airflow direction 33.

Figure 3:
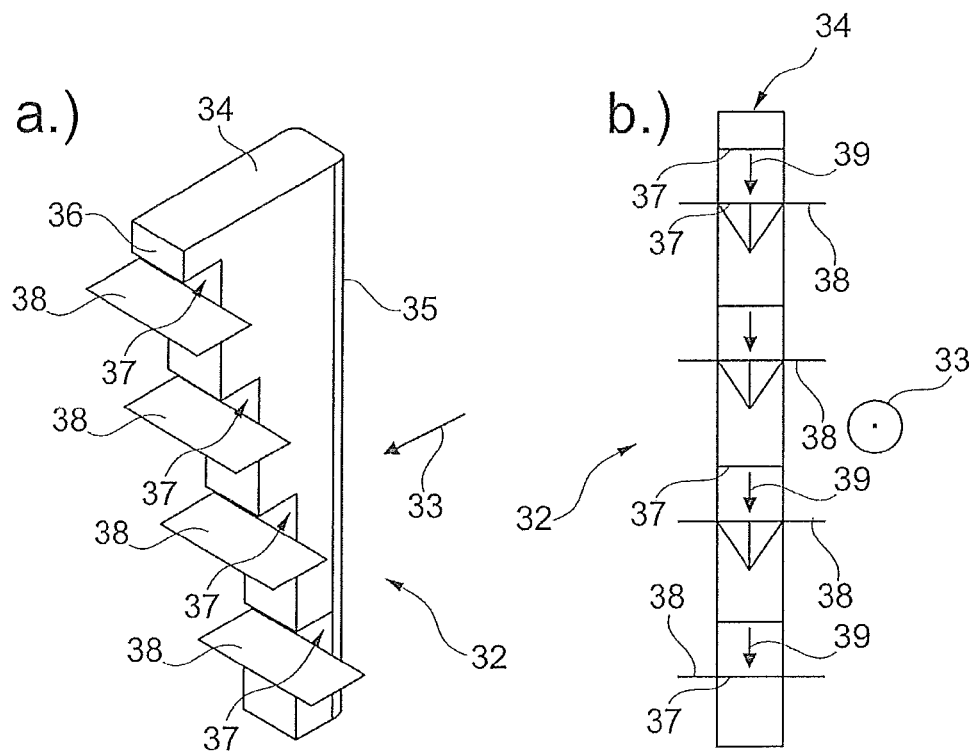
FIG. 3 in shows mixing finger with impingement plates and fluegas introduction in axial direction with respect to the axis of the finger, wherein a) shows a perspective view, b) a view opposite to the airflow direction, c) a lateral view onto an embodiment with straight leading edge, and d) a lateral view onto an embodiment with bent leading edge; e) shows a lateral view onto the horizontal section of an intake housing with two successive lines of mixing fingers and the corresponding introduction elements for fluegas, and f) a top view onto the horizontal section according to e)
Figure 3:
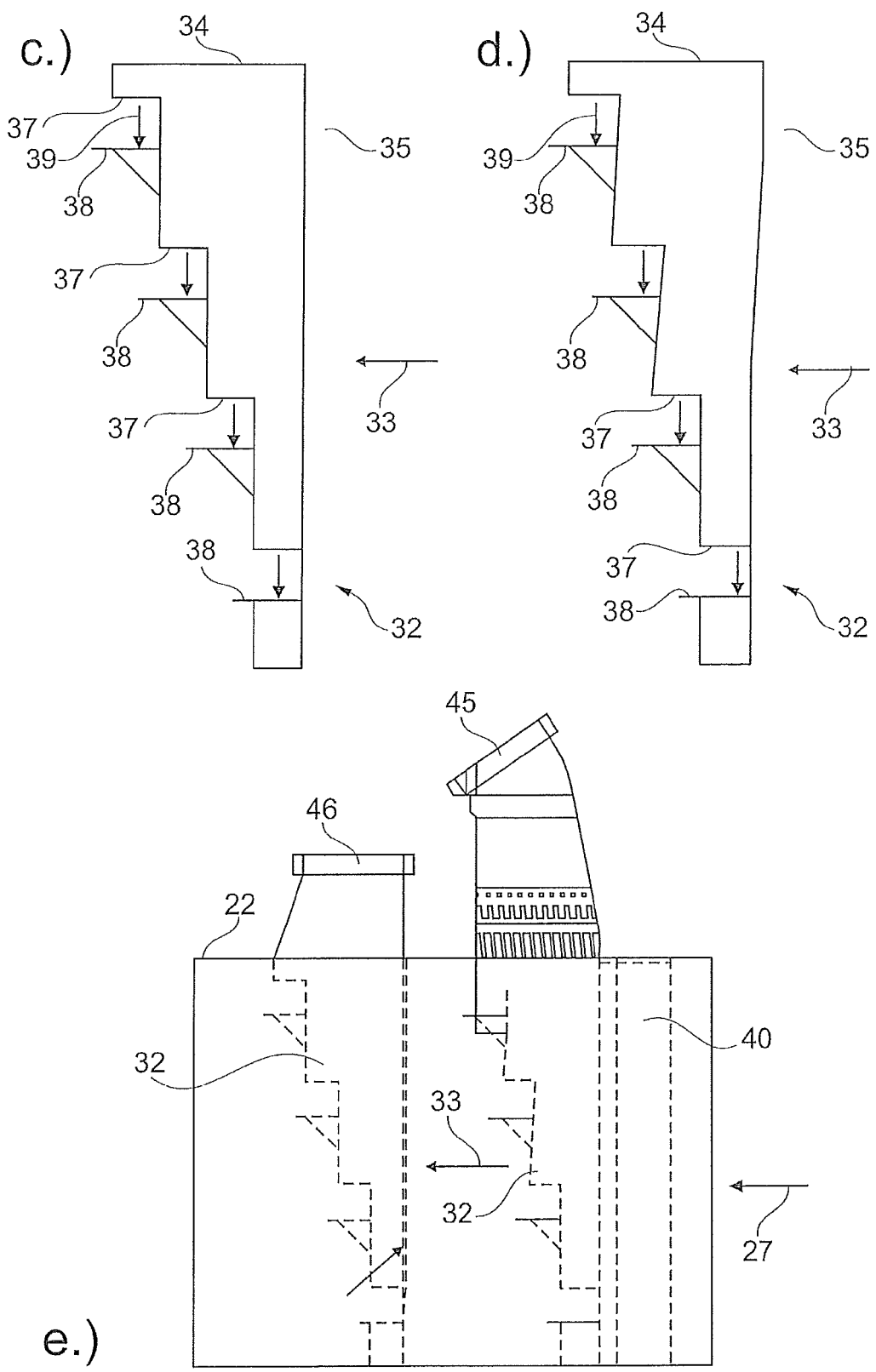
Figure 3:
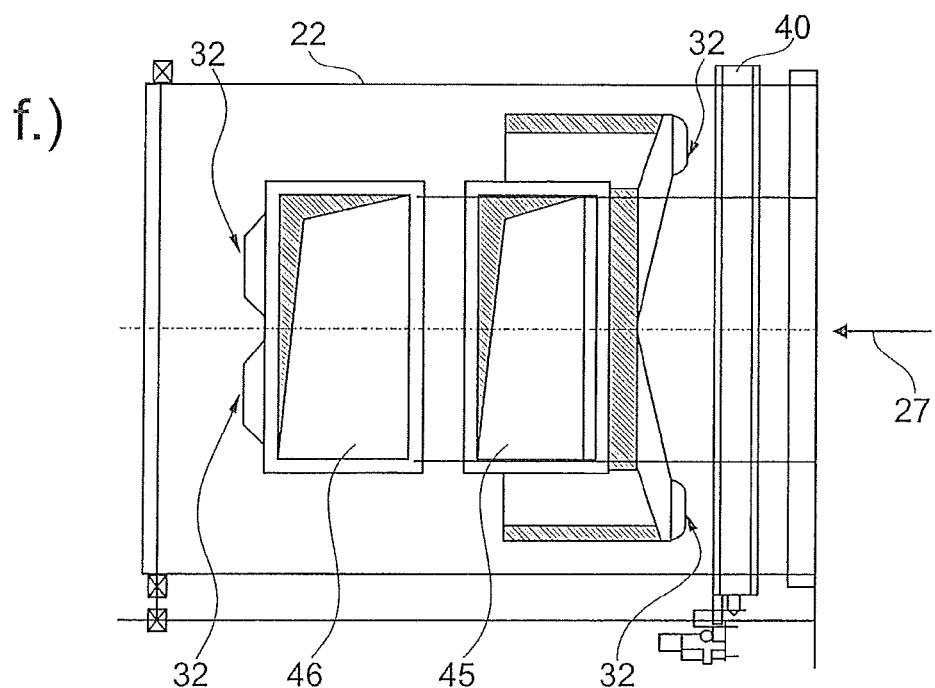

In FIG. 3 yet another embodiment of a mixing duct 32 is illustrated. In this case there are not provided a row of mixing ducts but there is provided one mixing duct with several blow out openings 36 distributed over the length of the mixing duct. The mixing duct is of a stepped design and at each step there is provided an outlet 37 blowing flue gas in a direction similar to the one as illustrated in FIG. 2b into the airflow. In this case the airflow 39 right downstream of the corresponding opening 37 impinges onto an impingement plate 38 which is arranged essentially perpendicular to the direction of the airflow 39 and in a direction parallel to the airflow 33 of the ambient air flowing in the flow path 31. These impingement plates 38 are mounted on trailing edge side walls of the mixing duct 32. The impingement plates 38 in this case laterally on both sides protrude beyond the side walls of the mixing duct, however it is also possible that the impingement plates 38 do not extend beyond the side walls.

Figure 2:
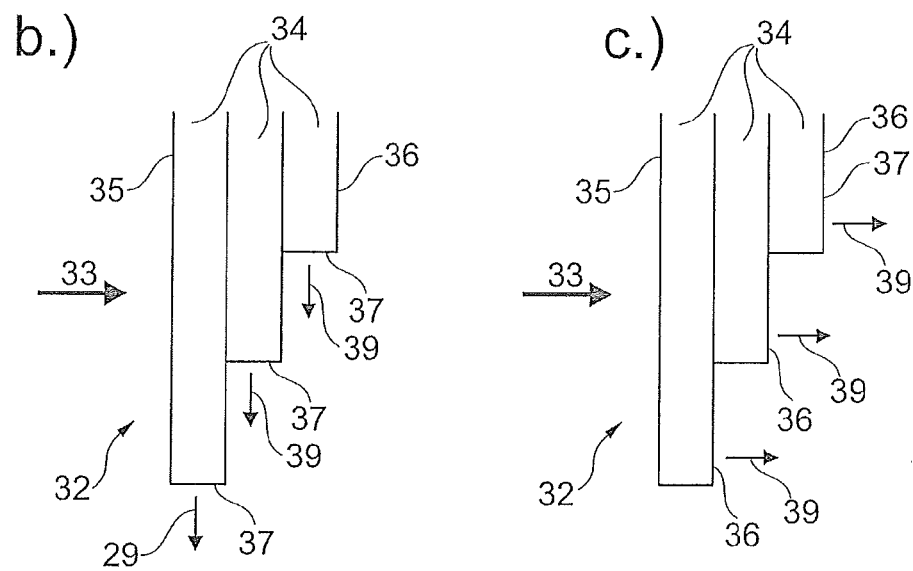

Generally speaking the mixing ducts 32, be it in a row as illustrated in FIG. 2 or structured with several openings 37 distributed along their length as illustrated in FIG. 3, can be built of metal sheet elements. They can also be built of tubular pipe-like elements. In order provide as little resistance to the airflow 33 at the leading edge 35 as possible, as illustrated in FIG. 3, this leading edge 35 is preferably rounded or can have a sharp leading edge. Preferably a flat leading edge with a surface essentially perpendicular to the direction 33 should be avoided.

The leading edge 35 is normally straight in a direction parallel to the axis of the duct as illustrated in FIG. 3c. It is however also possible, depending on the flow circumstances in the flow path 31, to have a shaped leading edge, as for example illustrated in FIG. 3d.

The mixing ducts, arranged in rows, can be, as illustrated in FIG. 2a, located in a series distanced from each other in a direction perpendicular to the flow direction 33. As illustrated in FIG. 3e, it is also possible to have several mixing ducts or rows of mixing ducts arranged following each other in the direction 33, so to have an upstream mixing duct 32 or row of mixing ducts 32, and a downstream mixing duct 32 or row of mixing ducts. Each of these mixing ducts can be supplied with re-circulated flue gas with individual ducts 45 and 46, as illustrated in FIG. 3e, or by using the same duct coupled to both rows. In the embodiment according to FIGS. 3e and f, actually the arrangement of mixing ducts is such that two upstream mixing ducts 32 are located laterally displaced with each other by a long distance, so close to the side walls of the section 22, in the flow path and are supplied with flue gas via duct 45. Downstream of this pair of mixing ducts there is provided a second group of mixing ducts 32, also displaced in a direction perpendicular to the airflow direction 33 but closer to each other so essentially filling the gap between the two upstream mixing ducts.

Figure 4:
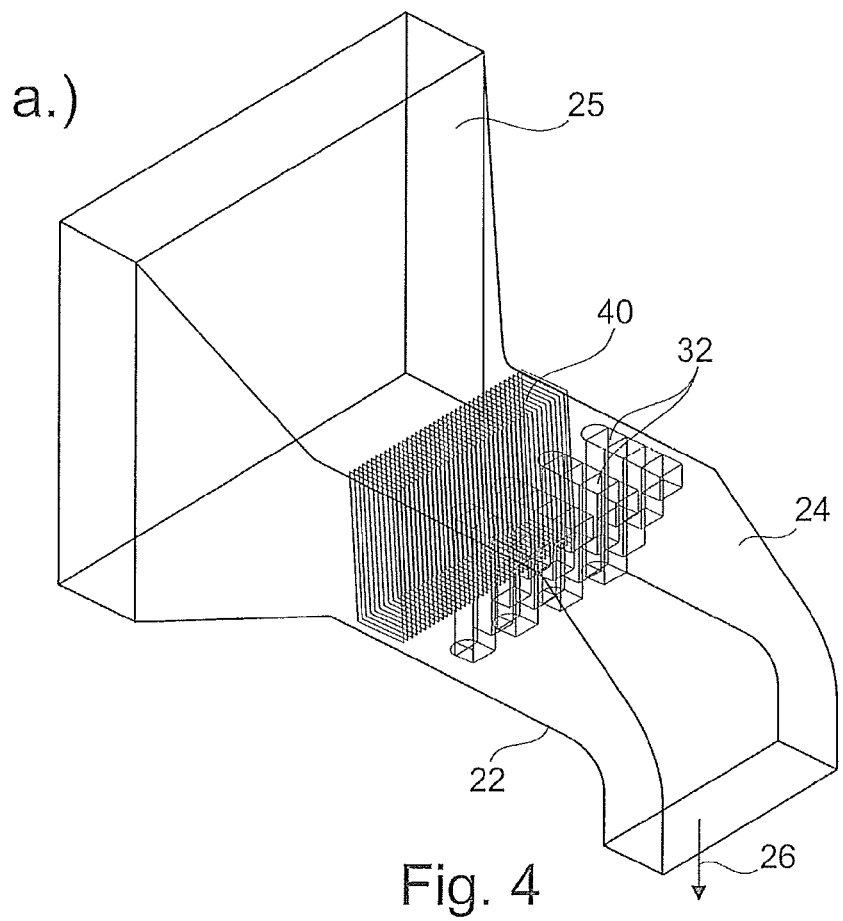
FIG. 4 shows an embodiment with 16 mixing finger ducts wherein the groups are arranged in one line of four rows of four ducts and wherein the mixing fingers are arranged downstream of the silencer, wherein a) shows a perspective view, b) shows a lateral view, c) shows a view opposite to the airflow direction, d) shows a top view.
Figure 4:
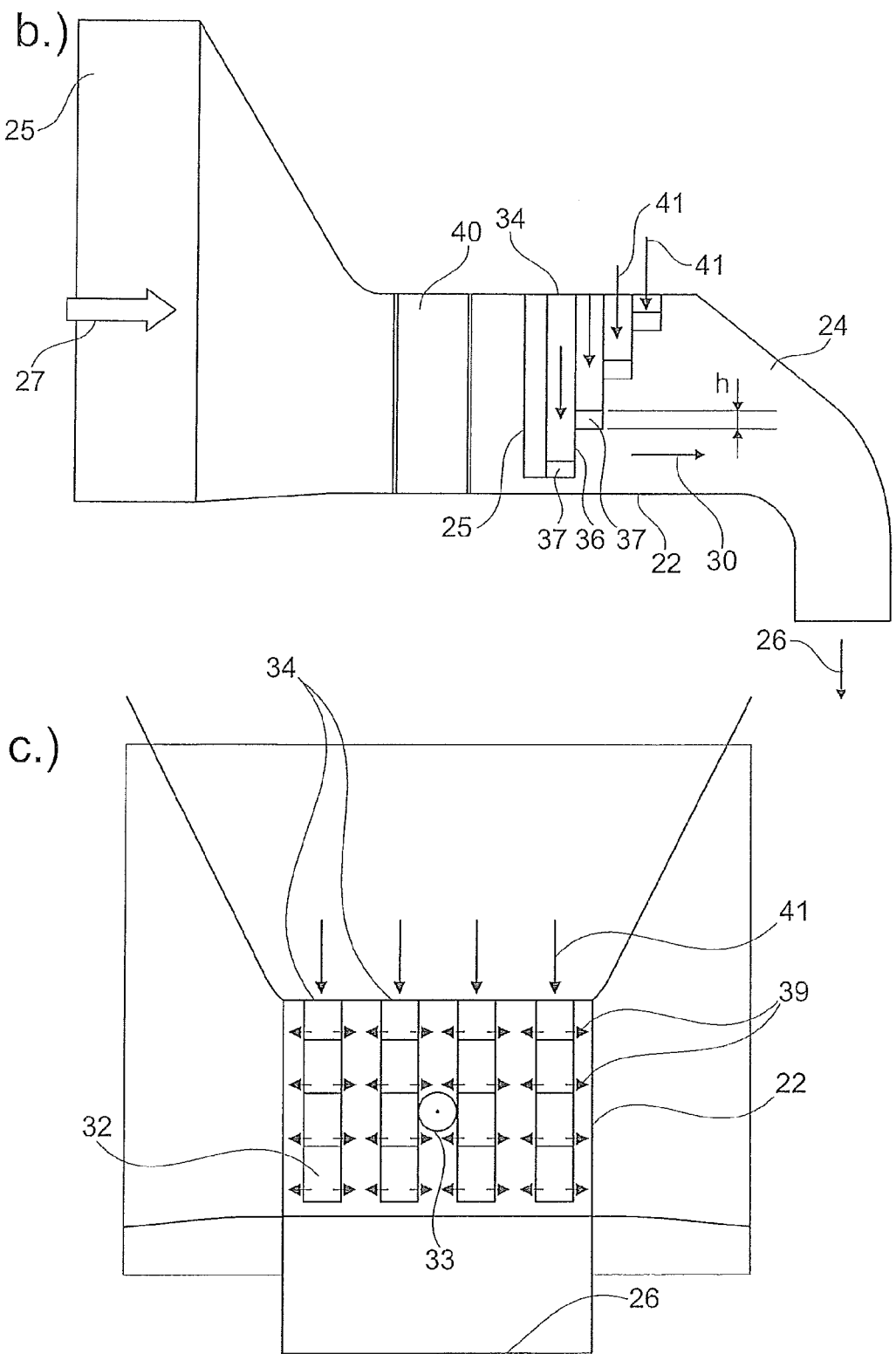
Figure 4:
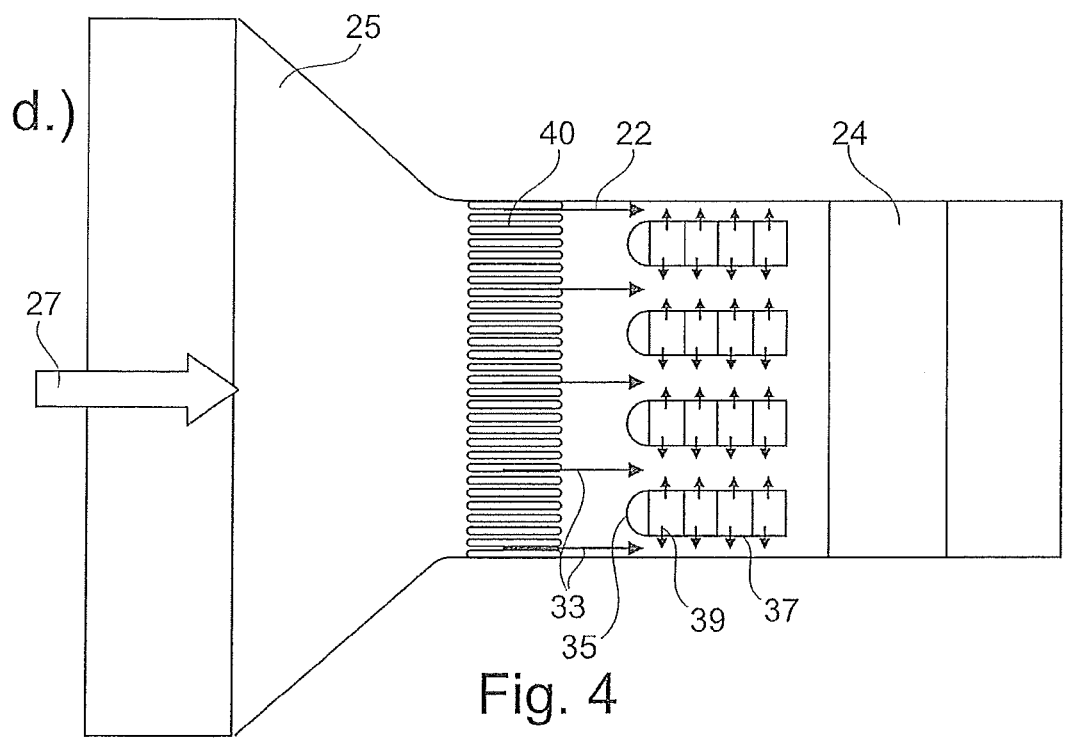

Yet another embodiment is illustrated in FIG. 4. Here one can see that downstream of the wide aspiration section 25 there is first located a silencer 40. There can also be provided in addition to that or replacing the silencer a filter in this position, a filter may also be located within section 25.

Downstream of the silencer 40 within section 42 there are provided four laterally displaced rows of mixing ducts 32 wherein again each row comprises in this case four mixing ducts of regularly decreasing lengths in a downstream direction. In this case each of the mixing ducts, in its terminal tip portion, comprises a bottom wall and at both lateral side a lateral opening 37 is provided through which the flue gas 41, as illustrated in FIG. 4b, passing through the tubular section of each mixing duct, is then blown out in a direction perpendicular to the flow direction 33, essentially in horizontal direction, as illustrated in FIG. 4c. Correspondingly the flue gas introduced into the airflow 33 is well distributed over the flow cross section thereof, and this in a vertical direction, as illustrated in 4c, and in horizontal direction, as illustrated in FIG. 4d, but also the mixing introduction takes place over a certain length of the flow path, as one can also see in FIG. 4d.

Figure 5:
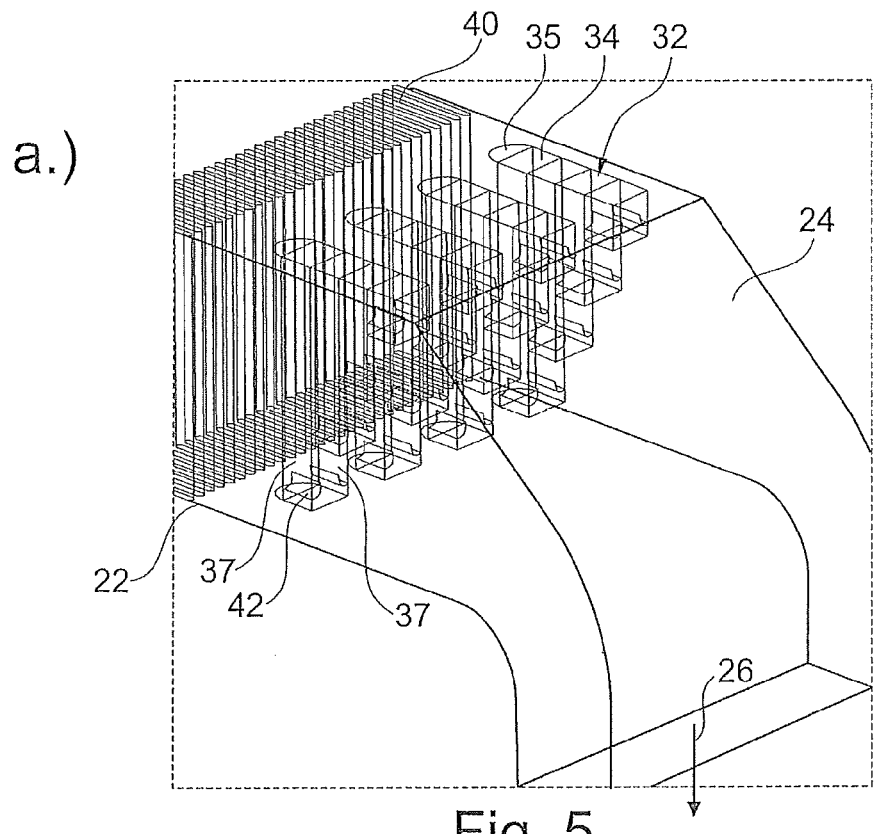
FIG. 5 shows in a) the horizontal and bent section of an embodiment with rounded guide vanes, in b) a detailed view opposite to the airflow direction onto the rounded guide vanes, in c) a general view opposite to the airflow direction onto this embodiment, in d) a lateral view and in e) a top view.
Figure 5:
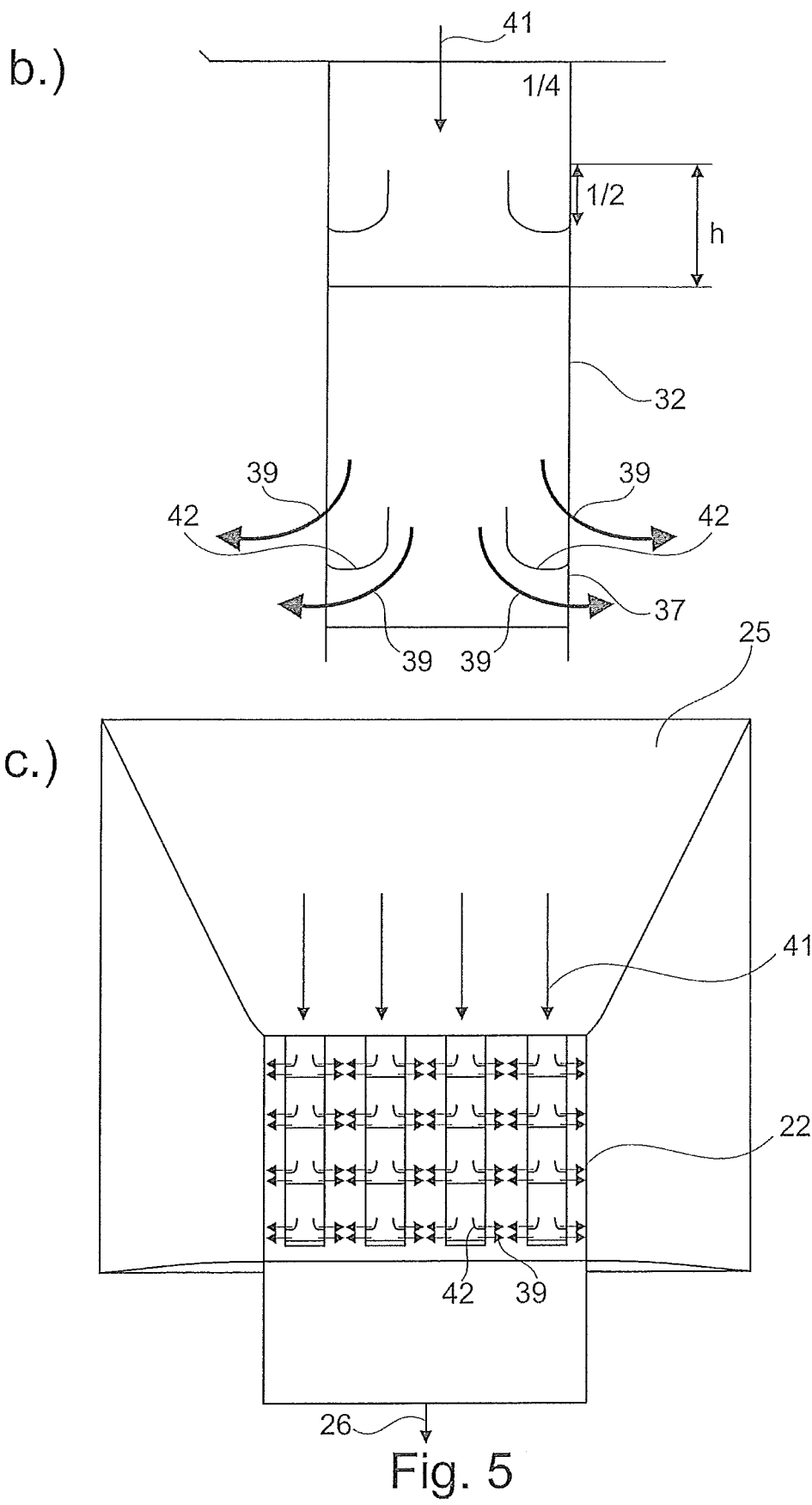
Figure 5:
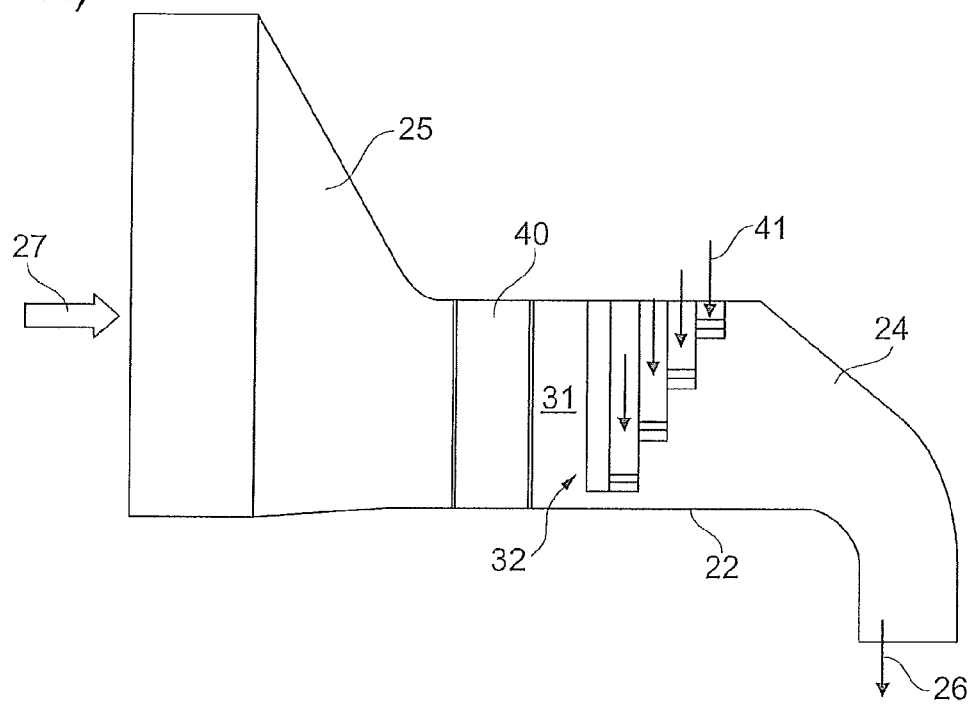
Figure 5:
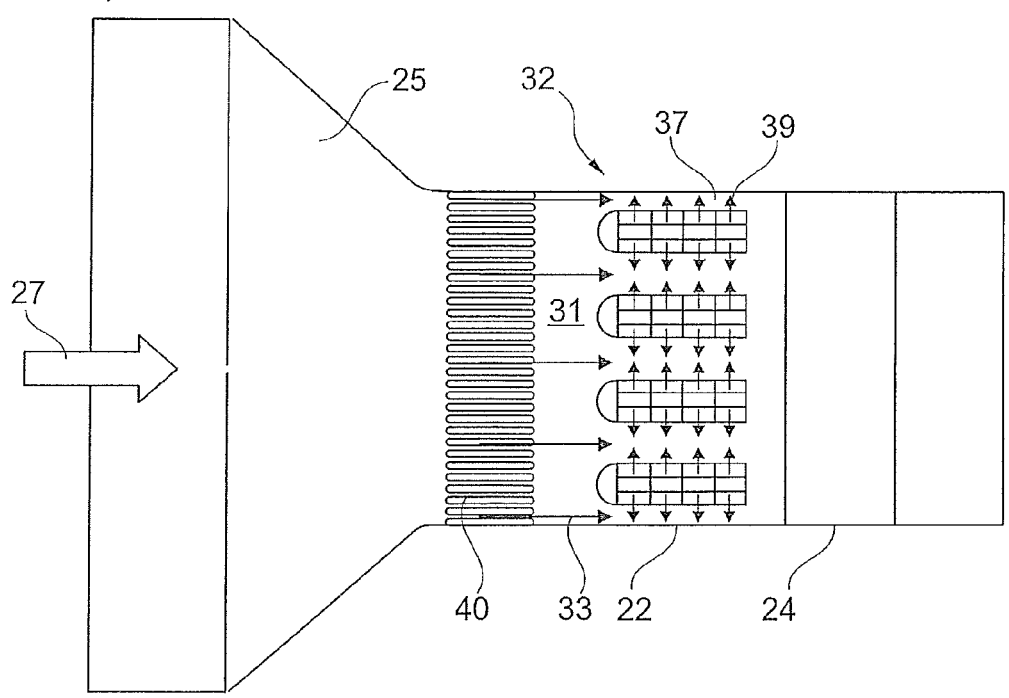

Yet another embodiment is shown in FIG. 5a. Essentially in this embodiment the same structure of sixteen mixing ducts arranged in four laterally displaced groups of four mixing ducts each is provided as in FIG. 4. However in this case the lateral openings 37 provided on each side of each mixing duct in the tip portion thereof with a height h as illustrated in FIG. 4b is provided with a rounded guide vane 42, the function of which is best illustrated by FIG. 5b. These rounded guide vanes make sure that the flue gas 41 passing through the channel of the mixing duct 32 in the region of the lateral openings 37 is exiting through these openings in a well distributed manner so not only under high speed and high pressure in the bottom region thereof but also in the top region thereof. This leads to a lower pressure loss in the mixing device and to an even more homogenous distribution and mixing.

Figure 6:
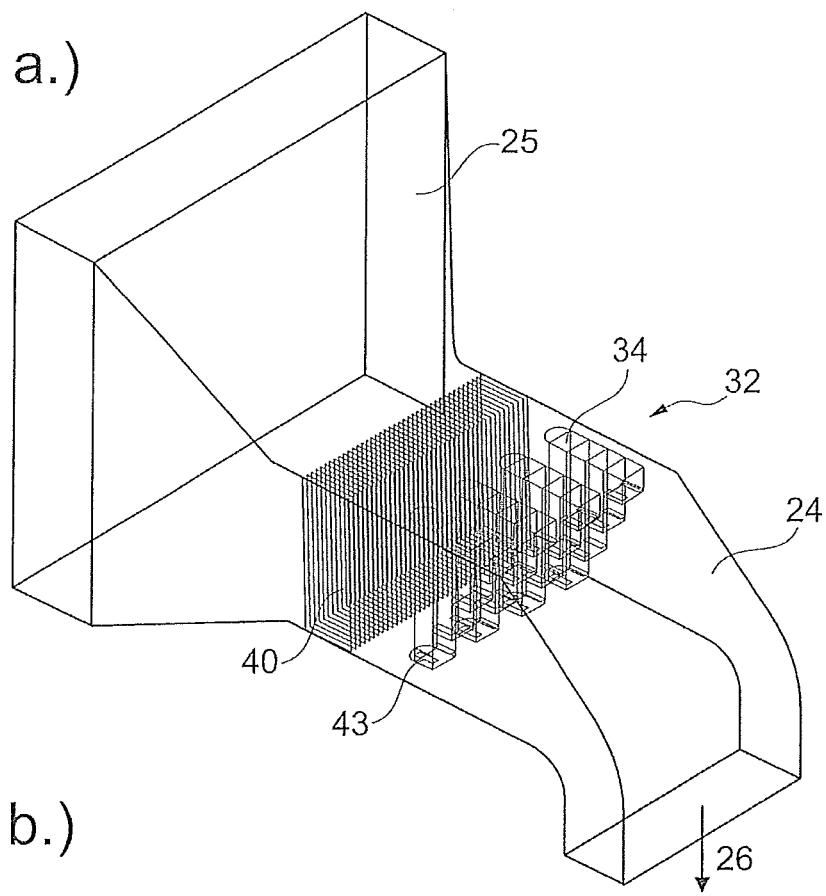
FIG. 6 shows an embodiment with straight guide vanes, wherein in a) a perspective view is shown, in b) a lateral view is shown, in c) a view opposite to the airflow direction is shown.
Figure 6:
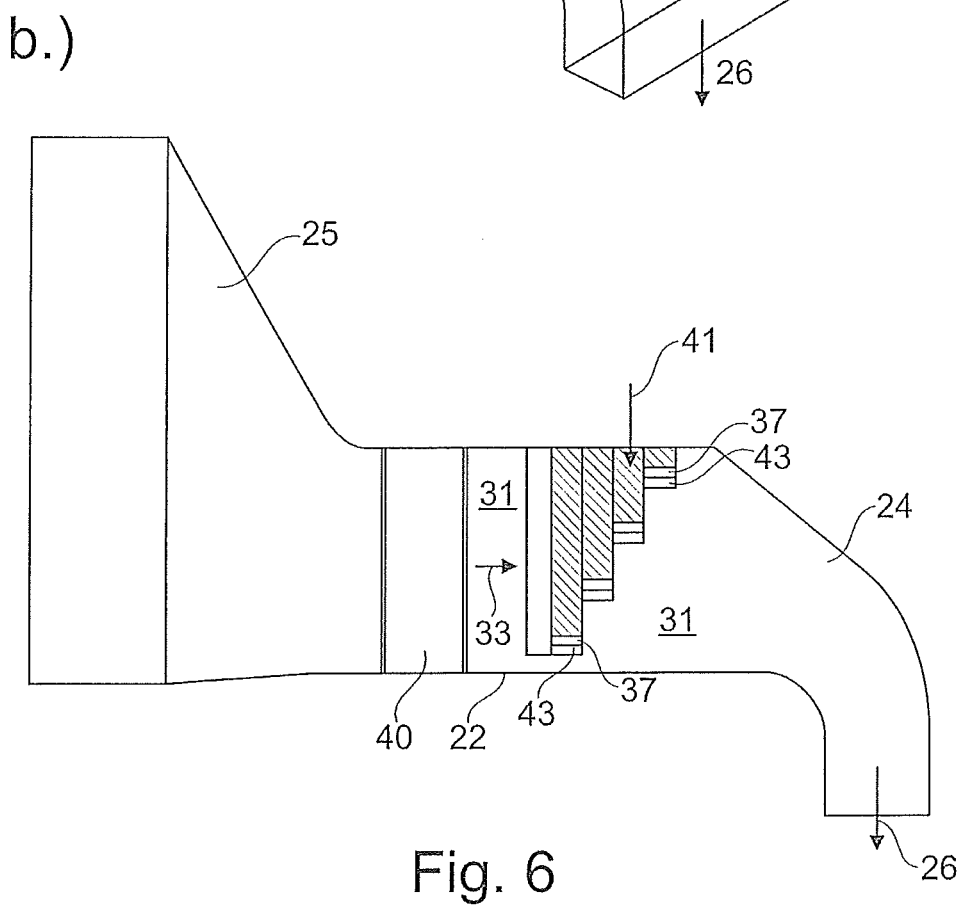
Figure 6:
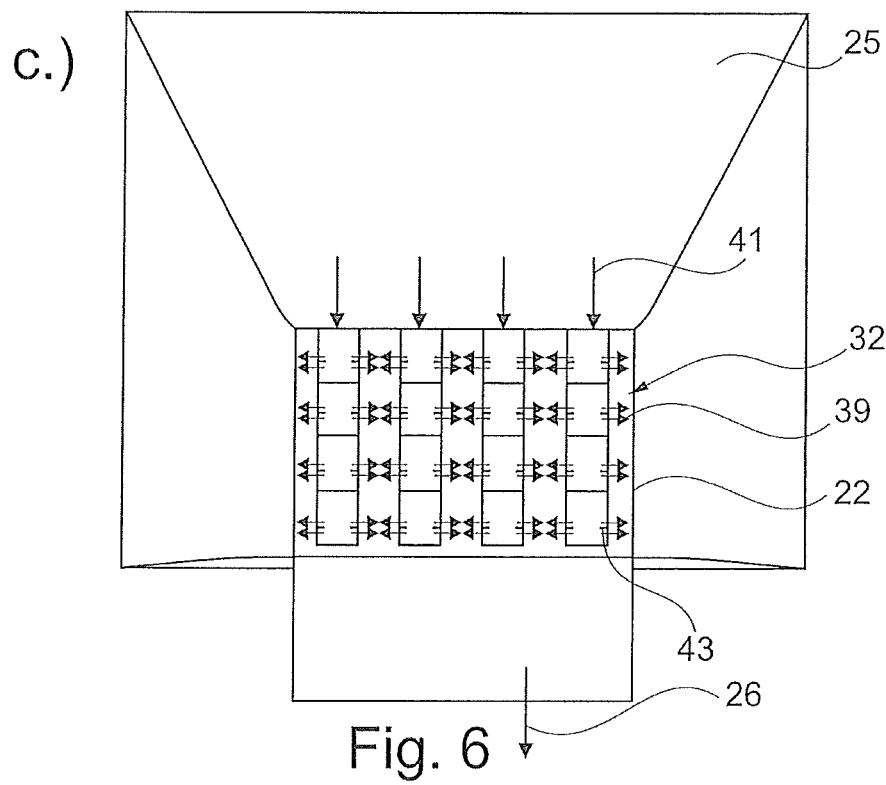

FIG. 6 shows a similar embodiment; in this case however, the guide vanes are not rounded but are provided as straight plates arranged essentially perpendicular to the main axis direction of the respective mixing ducts.

The vanes are typically arranged in or very close to the actual opening 27. As illustrated in FIG. 5b, the height of the vane is preferably chosen so as to be essentially at half height of the total height h of the opening 37. The width of the corresponding vane is preferably chosen to be about one fourth of the total lateral width of the mixing duct, so that one half of the airflow 41 is so to speak captured by the guide vanes and the other half can pass between them and exit via the part of the opening 37 located below the vane 42/43.

Figure 7:
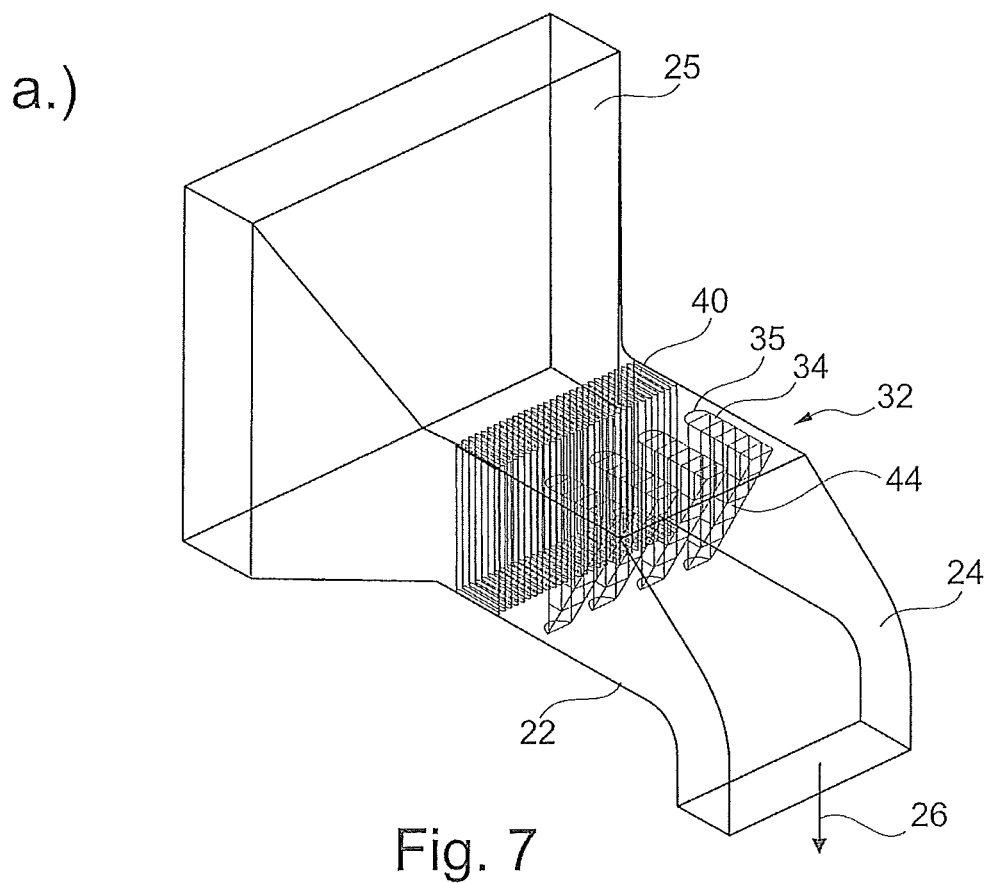
FIG. 7 shows an embodiment with triangular groups of finger ducts, wherein in a) a perspective view is shown, in b) the lateral view, in c) a lateral view with the airflows indicated, in d) a view opposite to the airflow direction, in e) a top view.
Figure 7:
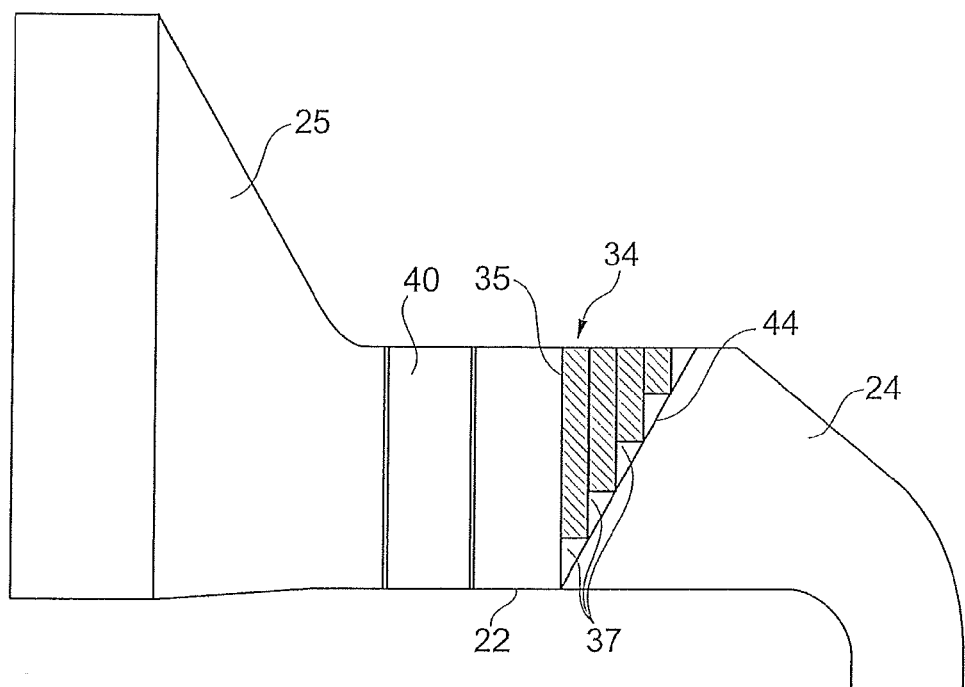
Figure 7:
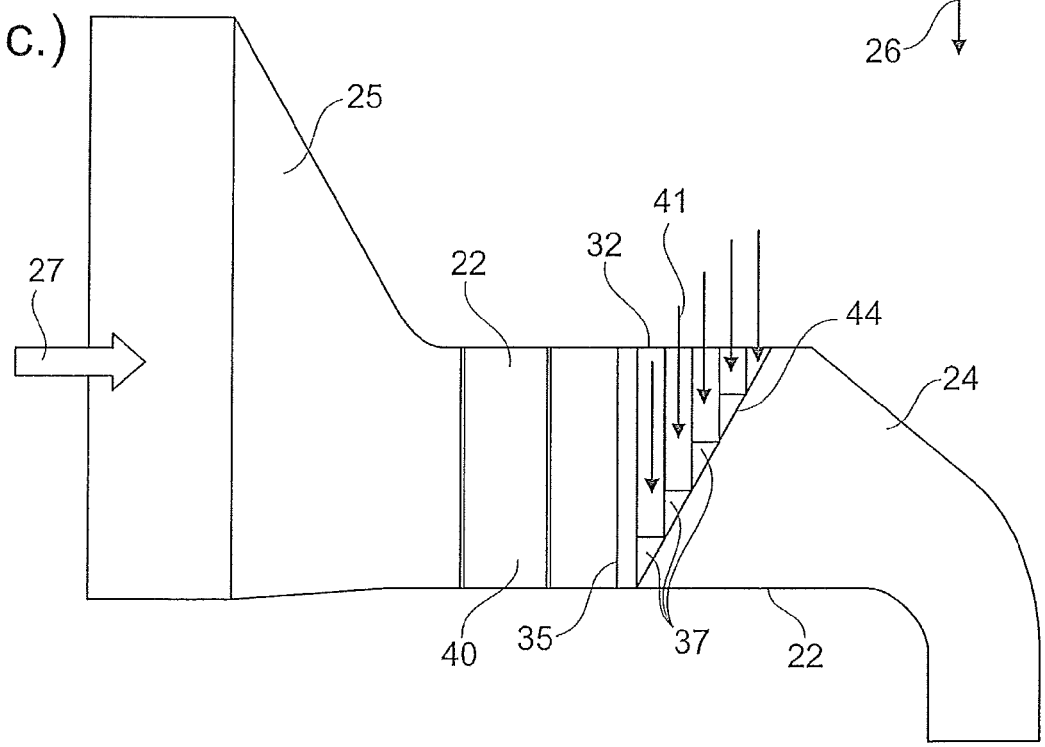
Figure 7:
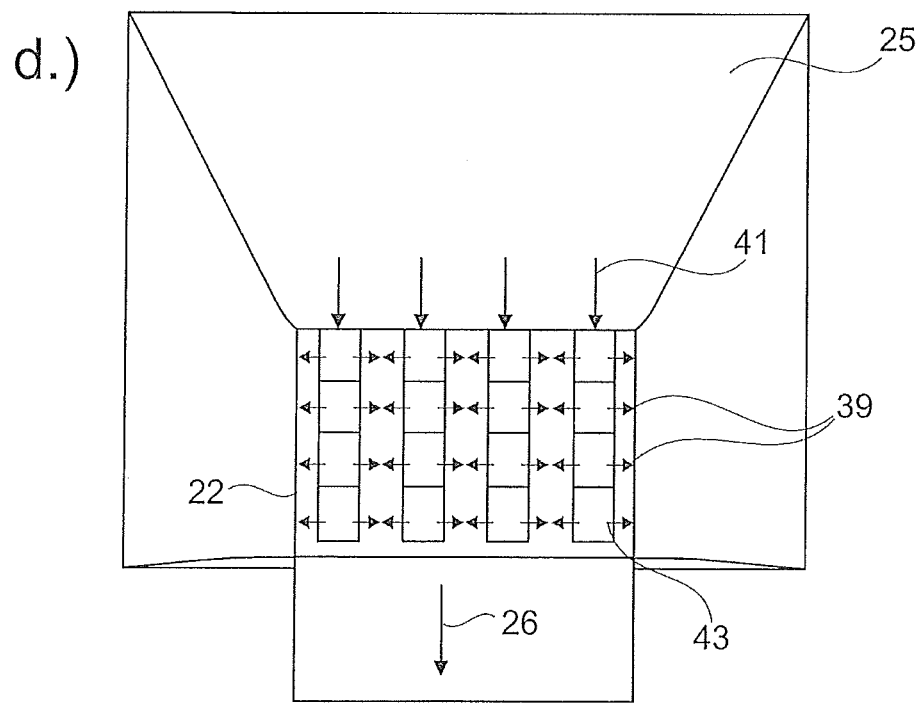
Figure 7:
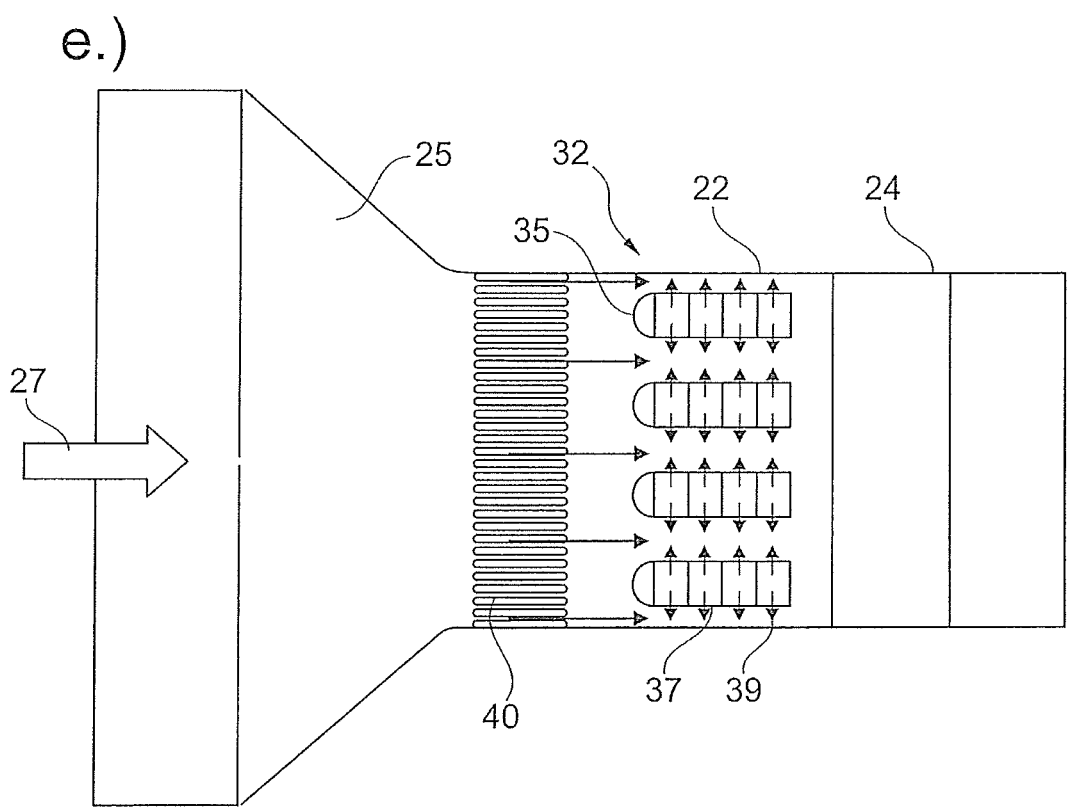

A final embodiment is shown in FIG. 7. In this case, where 20 mixing ducts are arranged in four groups of five mixing ducts each are of triangular shape. The trailing edge of this triangular group is formed by an inclined trailing edge wall 44. Due to this trailing edge wall, which is basically attached to a structure similar to the one illustrated in FIG. 2b, leads to triangularly shaped openings 37, as can be best viewed in FIGS. 7b and c. These triangularly shaped lateral openings lead to an even better distribution of the blowing out of the flue gas and in this case, as one can see from FIGS. 7b and c, the length of the triangular row of mixing ducts is such that it completely bridges the flow path section 22, allowing for attachment of the mixing element on to opposite side walls in this section thereby increasing stability of the whole set up.

What is claimed is:

1. An intake section upstream of an inlet of a compressor of a gas turbine unit with flue gas recirculation, the intake section comprising:
   at least one section of the intake section with a flow path defined by sidewalls in which airflow of intake air is flowing along an airflow direction;
   a plurality of mixing ducts extending into the flow path from at least one sidewall;
   each of said mixing ducts having an intake at said at least one sidewall for receiving recirculated flue gas of the gas turbine and having at least one outlet opening distanced from said sidewall for blowing recirculated flue gas out of the mixing duct into the airflow:
   wherein at least two, or at least three, or at least four, or at least five of the mixing ducts are arranged in a row adjacent to each other, said row being aligned along the airflow direction, a most upstream mixing duct defining a leading edge of the row,
   wherein the mixing ducts all have different lengths of extension into the flow path, and
   wherein the upstream mixing duct of the row extends most into the flow path, and the mixing ducts arranged in the row are of successively decreasing length as a function of downstream position such that a most downstream mixing duct of the row extends least into the flow path, and wherein the lengths are regularly decreasing along the row.

2. The intake section according to claim 1, wherein each mixing duct is attached to a single sidewall only and freely extends into the flow path, and wherein the at least one outlet opening is located in a tip region of the mixing duct.

3. The intake section according to claim 1, wherein along a direction perpendicular to the airflow direction at least two, or at least three, or at least four rows of mixing ducts that are distanced from each other, in the flow path, and/or wherein along the airflow direction at least two or at least three rows are distanced from each other in the flow path.

4. The intake section according to claim 1, wherein each mixing duct of the row of mixing ducts has an axis perpendicular to the airflow direction in the flow path, the row of mixing ducts extending into the flow path, wherein the airflow direction is parallel to the sidewalls.

5. The intake section according to claim 1, wherein each mixing duct comprises four pairwise parallel walls defining a duct, and wherein the at least one outlet opening opens in a direction perpendicular to the direction of the airflow or in a direction parallel and concurrent to the direction of the airflow.

6. The intake section according to claim 1, wherein the at least one outlet opening opens in a direction perpendicular to the direction of the airflow and perpendicular to an axis of the mixing duct, and wherein the at least one outlet opening is comprised of at least two outlet openings for each mixing duct to blow recirculated flue gas in opposite directions into the airflow in the flow path.

7. The intake section according to claim 6, further comprising at least one rounded or straight guide vane located in the at least one outlet opening or in a region of the at least one outlet opening and wherein the guide vane is located at half height of a total height of the outlet opening in a direction along the axis of the mixing duct.

8. The intake section according to claim 1, wherein the at least one outlet opening opens in a direction perpendicular to the direction of the airflow and parallel to the axis of the mixing duct, and wherein an impingement plate is located downstream, with respect to a flow direction of the flue gas, of the at least one outlet opening arranged perpendicular to the flow direction of the flue gas and parallel to the airflow direction.

9. The intake section according to claim 1, wherein the mixing ducts are arranged in a region where the flow path is defined by four pairwise parallel sidewalls, and
wherein a silencer and/or a filter is arranged upstream and/or downstream of the row of mixing ducts, the silencer and/or the filter being arranged in the region, upstream of the region, and/or downstream of the region.

10. The intake section according to claim 1, wherein the most upstream located mixing duct further comprises a rounded leading edge.

11. A gas turbine comprising an intake section according to claim 1.

12. The intake section according to claim 1, wherein the row has at least three mixing ducts.

13. The intake section according to claim 1, wherein the row has at least four mixing ducts.

14. An intake section upstream of an inlet of a compressor of a gas turbine unit with flue gas recirculation, the intake section comprising:
at least one section of the intake section with a flow path defined by sidewalls in which airflow of intake air is flowing along an airflow direction;
a plurality of mixing ducts extending into the flow path from at least one sidewall;
each of said mixing ducts having an intake at said at least one sidewall for receiving recirculated flue gas of the gas turbine and;
wherein at least two, or at least three, or at least four, or at least five of the mixing ducts are arranged in a row, adjacent to each other, said row being aligned along the airflow direction, a most upstream mixing duct of the row defining a leading edge of the row,
wherein the mixing ducts of the row all have different lengths of extension into the flow path, and wherein the most upstream mixing duct of the row extends most into the flow path, the most downstream mixing duct extending least into the flow path, and the mixing ducts arranged in the row are between being of successively and regularly decreasing length as a function of downstream position such that a most downstream mixing duct of the row extends least into the flow path, wherein the trailing edge of the row is defined by an inclined trailing edge wall, and
wherein each lateral side of the row has triangular outlet openings open in a direction perpendicular to the direction of the airflow and perpendicular to axes of the mixing ducts for blowing recirculated flue gas out of the mixing duct into the airflow.

15. The intake section according to claim 14, wherein the row has at least three mixing ducts.

16. The intake section according to claim 14, wherein the row has at least four mixing ducts.

17. The intake section according to claim 14, wherein the row has at least five mixing ducts.

18. The intake section according to claim 14, wherein along a direction perpendicular to the airflow direction at least two, or at least three, or at least four rows of mixing ducts that are distanced from each other in the flow path.

19. A method for recirculating flue gas comprising
mixing fresh ambient air with recirculated flue gas via an intake section upstream of an inlet of a compressor of a gas turbine, the intake section comprising:
at least one section with a flow path defined by sidewalls in which fresh airflow of intake air is flowing along an airflow direction;
wherein at least two mixing ducts are arranged in a row adjacent to each other, said row being aligned along the airflow direction, a most upstream mixing duct defining a leading edge of the row,
wherein the mixing ducts in the row all have different lengths of extension into the flow path, and
wherein the most upstream mixing duct of the row extends most into the flow path and the mixing ducts arranged in the row are of successively decreasing length of extension into the flow path as a function of downstream position.

20. The method according to claim 19, wherein flow control elements, controlled based on a mass flow measurement in a flue gas recirculation line and/or based on a measurement of a composition of the mixed intake air upstream of the compressor, and/or based on a measurement of combustion quality, provided in the mixing ducts or upstream of the mixing ducts are used for controlling mass flow of recirculated flue gas.

* * * * *